June 17, 1947.    H. T. WINCHEL    2,422,382
DISTANCE MEASURING APPARATUS
Filed March 29, 1943
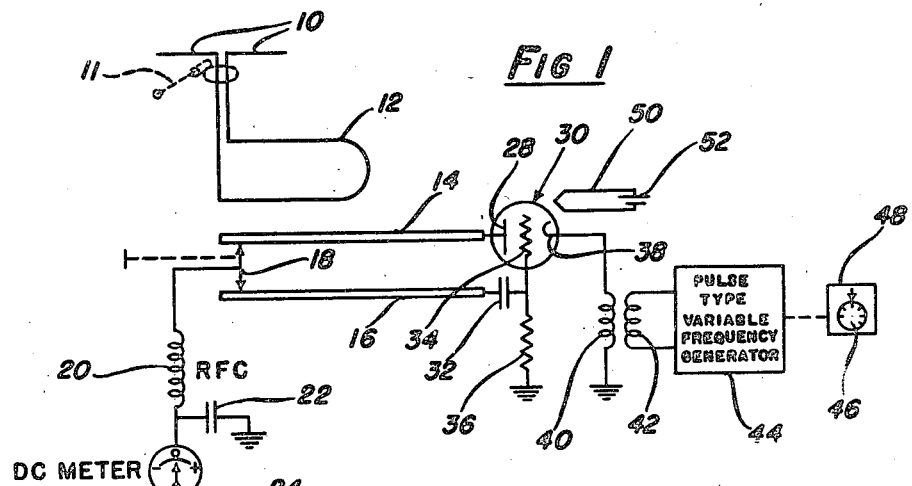
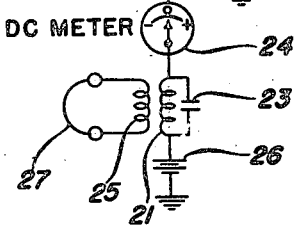
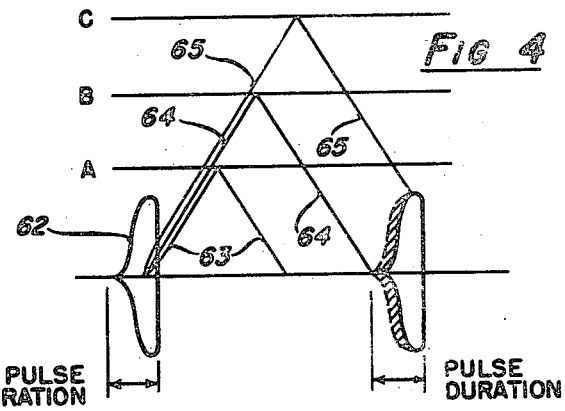
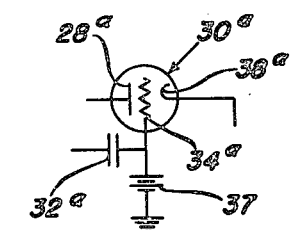
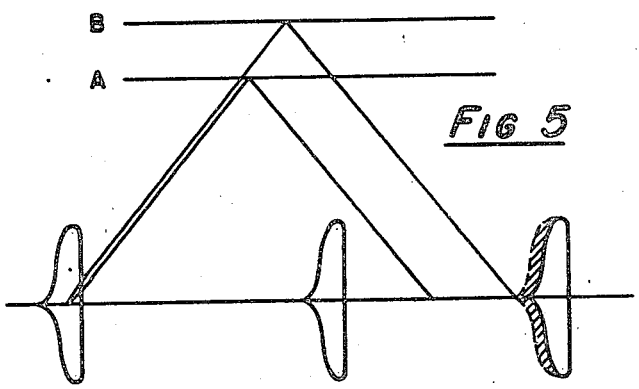
INVENTOR.
HENRY T. WINCHEL
BY Patented June 17, 1947

2,422,382

UNITED STATES PATENT OFFICE 2,422,382

DISTANCE MEASURING APPARATUS

Henry T. Winchel, North Hollywood, Calif., assignor, by mesne assignments, to Bendix Aviation Corporation, South Bend, Ind., a corporation of Delaware Application March 29, 1943, Serial No. 481,027

15 Claims. (Cl. 250—1.66)

This invention relates to the measurement of distances by radio energy, and more particularly to a superregenerative radio apparatus for the measurement of distances.

It is well known that by measuring the time elapsing from the transmission of a radio wave to the reception of the wave at the transmitter position, after the wave is reflected by striking an object, a measurement of distance may be obtained from the transmitter to the object. This results from the fact that the speed of radio transmission is substantially constant at 300,000,-000 meters per second. The present invention measures this time interval in a novel manner with a novel superregenerative circuit.

A superregenerative circuit is an oscillating circuit which is periodically interrupted by quenching the oscillations. The oscillations may be quenched in several ways, such as by driving the plate negative, or driving the cathode positive, or by driving the control grid negative to cut-off. The quenching may be performed by a separate voltage generator whose alternating output is impressed upon the plate, cathode or grid. The quenching may be also performed by a self-quench action wherein the oscillator tube or tubes are connected in a grid leak circuit with a high grid leak impedance so that the control grid collects more electrons than it can dissipate after a few oscillations, driving the grid negative to cut-off.

The frequency of oscillation at each period of operation is usually determined by a tuned circuit of inductance and capacitance. When the oscillations are quenched and the circuit returned to a condition wherein oscillations may again occur, the chance effects of thermal agitation, shot effect, etc., start the oscillations and they continue until they are quenched. These oscillations give rise to cathode, plate and grid direct currents, the size of which are directly dependent upon the duration of the oscillations before quench. If this superregenerative circuit is used as a receiver, an antenna is coupled to the oscillatory circuit. If a carrier wave is received having a frequency close to that of the tuned circuit, voltages will be induced in the circuit and will initiate the oscillations of the circuit when it is returned to an operable condition after quenching.

The effect of a received signal is to start the oscillations at an earlier instant during the operable period of the circuit than is the case when the chance factors of thermal agitation and shot effect start the oscillations. The result is a group of oscillations of longer duration than in the absence of a signal, resulting in a changed grid, plate or cathode direct current according to the circuit arrangement. Thus a received signal, even though a continuous wave type, is indicated by a definite change in the direct current of the grid, plate or cathode of the oscillatory tube.

A second effect of a received signal is to eliminate the characteristic noise or hiss of the usual superregenerative circuit which is present when head-phones are coupled to the circuit. The characteristic noise is caused because of the irregular start of oscillations when the circuit is placed in an oscillating condition. These random oscillations give rise to irregular audio envelopes, resulting in an audible noise. The effect of a received signal is to start the oscillations at a fairly regular time with respect to the oscillatory periods. Since all oscillations are at regular intervals and at a super-audio rate, there is no audio envelope formed (unless the received wave was audio modulated) and the characteristic noise disappears. Thus the disappearance of the characteristic noise is an alternative means of determining the presence of a received signal in the present invention.

As just described, the superregenerative receiver is by nature an oscillatory circuit. The same antenna which induces voltages in the tuned circuit because of received signals, will, by its coupling, also transmit any oscillations in the circuit. Thus a superregenerative receiver with a tightly coupled antenna is also a transmitter, transmitting and receiving simultaneously. The present invention employs this construction to provide a distance measuring device.

The superregenerative circuit of the invention differs from the usual type of quench control in that the quench wave is of the pulse type. The present quench voltage is more accurately referred to as a "pulse operating" voltage, since the circuit is in a non-oscillating condition most of the time and oscillates only during a pulse of the separate "quench" voltage. The pulse type wave is one wherein the energy of the wave occurs in a very short time compared to the frequency of the wave. Present type pulse generators are suitable wherein the pulse duration may be one tenth of the frequency. For this reason the "quench wave" will be referred to as the "operating pulse." The result of pulse operation is to transmit and receive radio energy over short periods with long non-operating periods intervening, aiding the precise synchronism of reflected signals with the oscillatory periods of the circuit. Pulse type operation is not essential to the invention, particularly at the higher frequencies, but is advantageous at the lower "quench" frequencies.

Distance measuring devices as previously known have insensitive detection circuits compared to a superregenerative circuit, because the prior devices generally employ insensitive control elements such as diodes to prevent overloading. This, in turn, requires a powerful transmitter with many component parts to allow for the reduced strength of reflected signals. The present superregenerative measuring circuit, on the other hand, is very sensitive and cannot be affected by overload. This makes possible a transmitter of low power having few and light weight component parts. Furthermore, by using the radiation characteristic of a superregenerative receiver, the transmitter and receiver is combined in one unit, further reducing weight.

Another characteristic of present day distance measuring devices is that separate antennas are used for transmitting and receiving. In the present invention the same antenna is used to transmit and receive signals, thus insuring that the construction having the most directional gain for transmitting also has the most directional gain for receiving and vice-versa. Thus the present invention makes use of a single transmitting and receiving circuit to employ a single transmitting and receiving antenna.

It is therefore an object to provide a radio distance measuring device of the reflected wave type wherein one circuit acts as both a transmitter and receiver.

Another object of the invention is to provide a distance measuring device of the reflected wave type wherein one antenna array simultaneously transmits and receives distance measuring radio energy.

Another object is to provide a distance measuring circuit which simultaneously transmits and receives energy, the sensitivity of the receiver being so great that a low powered transmitter is practical, resulting in a single radio set for the entire function which is small and light weight.

An object of the invention is to provide a simple and compact radio apparatus of the superregenerative type.

Another object of the invention is to provide a simple and compact radio apparatus for the measuring of distances.

Still another object is to provide a superregenerative radio distance measuring device wherein the quench frequency indicates the elapsed time between transmission and reception of the signal.

Another object is to provide a superregenerative distance measuring device wherein varying distances are determined by varying the quench frequency.

Another object is to provide a superregenerative distance measuring device wherein signal response is indicated by measuring the plate current of the superregenerative tube.

Another object is to provide a superregenerative distance measuring device wherein the reception of a signal is indicated by means producing characteristic noise, the signal being indicated by the absence of the noise.

Another object is to provide a superregenerative absolute altimeter for airplanes.

Other objects and advantages of the invention will be apparent in the following description and claims.

In the drawings forming a part of this specification:

Figure 1 is a schematic circuit of one embodiment of the invention showing a separately quenched grid leak superregenerative circuit.

Figure 2 is partial circuit diagram showing a modification of the circuit of Figure 1 for grid bias operation.

Figure 3 is a partial circuit schematic showing a modification of Figure 1 for self-quench operation wherein a variable resistor is calibrated for different quench frequencies.

Figure 4 is a diagram of the envelope of the oscillations occurring during a pulse, showing a wave transmitted by the oscillations of one pulse and reflected and received during the succeeding pulse; and Figure 5 is a diagram of the envelope of the oscillations occurring in a pulse, showing the wave transmitted during one pulse being reflected and received by the second succeeding pulse.

Referring to Figure 1, a directional transmitting and receiving dipole antenna 10 is manually moveable by the mechanism 11 and is connected to a loop 12. Loop 12 is magnetically coupled to rods 14 and 16, which form a capacity-inductance tuned circuit for ultra-high frequencies. The tuning of frequency of rods 14 and 16 is varied by mechanically sliding a contactor element 18 lengthwise of these bars. Contactor 18 is connected to radio frequency choke 20, having a radio frequency ground through condenser 22. The lead from contactor 18 also passes through a direct circuit meter 24, having a zero point for average direct current flows and capable of reading currents which are greater or less than this average direct current flow, and which are designated as positive and negative respectively. The meter 24 is connected to a winding 21 having a by-pass condenser 23 connected across it; coupled to winding 21 is a winding 25 to which is connected a pair of headphones 27. Winding 21 is connected to a battery 26, the other end of which is grounded. Choke 20 and condenser 22 isolate signal frequencies from the meter, so that only direct current flows through meter 24, resulting in a direct measure of the plate current of the superregenerative circuit, which will now be described.

Rod 14 is connected to a plate 28 of a vacuum tube 30, and the other rod 16 is connected through a grid condenser 32 to a grid 34 of tube 30. Grid 34 is connected to ground through a grid resistor 36, for grid leak operation of the tube 30. A cathode 38 is connected to a winding 40, which is connected to ground. Coupled to winding 40 is a winding 42 which delivers the output of a pulse type variable frequency generator 44, shown in block form. The frequency of generator 44 may be varied by manually rotating a disc 46 in a control box 48, mechanically coupled to variable generator 44. A cathode heater circuit 50 having a battery 52 completes the circuit of Figure 1.

The generator 44 is of the pulse type; that is, the wave form generated is such that the energy is delivered in a relatively short period of time compared to the frequency of the generator. This generator may be of any type, such as is well known in the art, and a pulse duration of approximately two millionths of a second, or two micro-seconds, is easily obtained at 60 kilocycles. The pulse will be of correspondingly shorter duration at higher frequencies. Improvements on present generators for use with improved oscillator circuits may result in an even shorter pulse duration to facilitate accurate measurement of short distances.

The operation of the circuit of Figure 1 is as follows:

The pulse generator 44 drives the cathode 38 alternately positive and negative. When the cathode 38 is positive, or at zero voltage with respect to ground, the tube is inoperative and there are no oscillations in the tube 30. When the cathode 38 is driven negative, thermal agitation causes the tube 30 to oscillate at the frequency of the tuned circuit 14 and 16. This circuit is of the feed-back type, the feed-back being effected through inter-electrode capacitance. Any suitable type oscillator known in the art may be used, however. The frequency of the tuned circuit depends upon the application and is preferably an ultra-high frequency for best distance measuring applications. The range of frequencies of the pulse type generator 44 is dependent upon the distances that are expected to be measured, as explained hereafter. The ultra high-frequency must be some substantial multiple of the highest pulse frequency.

The oscillations appearing in tuned circuit 14 and 16 are induced in antenna loop 12 and transmitted by antenna 10. Likewise, by the same coupling, signals received by antenna 10 are induced in tuned circuit 14 and 16, causing the circuit of Figure 1 to act as a receiver as well as a radio transmitter.

The presence of a received signal is indicated in the circuit of Figure 1 by the direct current meter 24. This indication occurs because of the well-known phenomenon in grid leak superregenerative circuits that the plate current decreases in the presence of a signal. Thus, during transmission of the signal the plate current will be a fairly constant value, but when the signal is received the plate current will decrease and the meter 24 will show a decreased amount of current flowing from the B battery 26. The presence of a signal is also indicated by the lack of a characteristic noise in the phones 27.

Figure 2 shows the tube 30 of Figure 1 operated as a grid bias tube, wherein the resistor 36 of Figure 1 is replaced by battery 37, maintaining a fairly constant bias voltage of grid 34. As is also well known in the superregenerative art, the plate current increases in the presence of a signal for a tube having fixed grid bias. Thus, the meter 24 of Figure 1 would show an increased current over the normal value when the circuit of Figure 1 is connected, as shown in Figure 2.

Figure 3 shows a second modification of the circuit of Figure 1, showing the tube 30 operated as a self-quenching superregenerative tube instead of employing the separate quench oscillator 44, as shown in Figure 1. The grid resistor 36b is of the variable type, and may be varied as indicated on a calibrated scale 39 to give variable quench frequency. Self-quenching is accomplished by making the grid resistor of high enough impedance in combination with the grid condenser 32b so that a definite time interval is established in which to discharge the grid condenser 32b, according to the value of resistor 36b. When the grid resistor 36b is of high enough impedance the grid 34b collects electrons faster than the resistor will dissipate them, driving to cut-off, thus quenching the oscillator.

The operation of the circuit of Figure 1, and also the circuits of Figures 2 and 3, will now be described with relation to their distance measuring function. Shown in Figure 4 is the envelope of the ultra-high frequencies when a pulse type operating wave is used which is preferable in this distance measuring application, although any wave form could be used with good results. It will be noted that the duration of the pulse is relatively short compared to the frequency of the pulse operating voltage. Also indicated in Figure 4 are the ultra-high frequencies which are radiated at each peak of the pulse voltage, the envelope of which is designated as 62. The ultra-high frequencies of circuit 14 and 16 are transmitted through antenna 10, as indicated by the lines 63, 64 and 65 of Figure 4. If the waves 64 strike an object B, for example an object which may be deliberately sought after by directing the antenna 10 at the object, they will be reflected back to antenna 10 and received as an incoming signal, designated by the same number 64 in Figure 4. The effect of an incoming signal is to initiate the high-frequency oscillations 62 at an earlier stage than is normally the case in the absence of a signal wherein oscillations occur by the chance effects of thermal agitation, shot effect, etc. This increase of oscillations is indicated in Figure 4 by the shaded area of ultra-high frequency oscillations on the second envelope of Figure 4. The angle of reflection in practice is zero degrees but an appreciable angle of reflection is shown in Figure 4 to indicate the passage of time between transmission and reception.

It will be apparent upon an inspection of Figure 4 that a transmitted signal will be received as an incoming signal only when the incoming signal is received during the interval of time just preceding one of the oscillatory periods as is well known in the art. At all other times the circuit of Figure 1 is inoperative and such reflected signals will not be indicated. This is shown in Figure 4 by the waves 63, wherein signals strike object A and are reflected but not received, because the circuit of Figure 1 is inoperative and hence will not indicate the signal. If waves 65 strike an object C and are reflected and received at the peak of oscillations of the second envelope, they will have no effect since they cannot increase the number of oscillations. Thus the responsive part of the operating pulse is the first part.

As mentioned previously, the effect of a received signal is to increase the number of ultra-high frequency oscillations at each oscillating period. In a grid leak oscillator tube, this results in a decreased plate current and an increased grid current. The decrease of plate current will be registered by meter 24 of Figure 1, and the pulse generator 44 is varied manually by dial 46 until this decrease is a maximum value, as indicated on meter 24. Also, there is a minimum amount of characteristic noise indicated by the head phones 27. This in turn indicates a complete synchronization of the first part of the operating pulse with the reflected incoming signal. The distance of the object reflecting the signal may be measured directly by calibrating the dial 46 directly in distance, using the known relation that a radio wave travels with the speed of light, or three hundred million meters per second, and bearing in mind that the transmitted wave travels twice the distance to the object before it is received. Thus, with directional antennas, a particular object may be selected, the wave transmitted, and the pulse generator varied until the received signal response is a maximum, and the distance is then indicated directly on dial 46.

When the circuit of Figure 1 is operated as a grid bias oscillator the signal response will be indicated by an increase in plate current which will be registered by meter 24 as an increase over the average plate current. When the circuit of Figure 1 is operated as a self-quench oscillator, as shown in Figure 3, the calibration of distance is read directly off of scale 39, since variable resistor 36 controls the frequency of the self-quench.

Shown in Figure 5 is a means of increasing the distance of response of the circuit of Figure 1. When the dial 46 is moved to the upper limit of frequency of generator 44, it may be rotated further to return the generator 44 to a lower frequency, but to read the distances on dial 46 on a different scale. The purpose of this is to receive transmitted signals on a second or third pulse succeeding the transmitted pulse, rather than on the pulse directly succeeding the transmitted pulse. This is shown in Figure 5, wherein the transmitted wave is received by the second succeeding operating frequency pulse, extending the range of operation of the circuit of Figure 1 for the greater distances. Any signal which is received by the second succeeding pulse will be comparatively weak because of the great distance traveled. Thus a small maximum deflection will indicate that the reflected wave is being received on the second pulse. This feature of the invention is very important, since it extends the operation of a circuit with a pulse type generator of limited top frequency.

From the foregoing description of the invention it is apparent that a superregenerative circuit acting simultaneously as a transmitter and receiver can be used to measure distances; when the antenna 10 is made directional in form it may be used as an altimeter or a directional detection apparatus. The pulse frequency control may be calibrated to indicate distances. Further, automatic frequency changing devices may be used to give a continuous automatic reading. This is preferably done by an automatic sweeping of the frequency of the pulse operating voltage. Then, by interpolating and/or comparing plate current change resulting from the return wave, several means or methods may be used to obtain the automatic type of distance indication. The range of measurement is dependent only on the power, the reflecting qualities of the transmitted wave, and the sensitivity of the receiver for the greater distances. In this connection it should be noted that a superregenerative receiver is extremely sensitive. The lower limit of distance measurement is the pulse frequency relative to build up time. For example a quench frequency of one megacycle can measure the distance to an object 150 meters distant, which is a suitable distance for absolute altimeters.

Although the invention has been described with relation to a particular embodiment thereof, it is not limited to this embodiment, nor otherwise except by the terms of the following claims.

I claim:

1. A superregenerative distance measuring device comprising an oscillatory circuit, an antenna coupled thereto, a separate pulse generator variable in frequency, for placing the circuit in an oscillatory condition for a short period compared to the frequency of the pulse generator, and means to indicate the reception of a signal during a pulse, the reception of signal during a pulse of a given frequency being the measure of the distance from a reflecting object.

2. A superregenerative distance measuring device comprising an oscillatory circuit, an antenna coupled thereto, a separate pulse frequency generator for placing the circuit in an oscillatory condition for a short period compared to the frequency of the pulse generator, and means to indicate the reception of a signal during a pulse, the reception of a signal during a pulse of a given frequency being the measure of the distance from a reflecting object.

3. A radio energy distance measuring device comprising a superregenerative circuit for simultaneous transmission and reception, a directional antenna tightly coupled to said circuit so that the energy in the circuit is always transmitted and so that received signals will be impressed upon the circuit, a separate variable quench frequency generator coupled to said circuit, and means to indicate reception of a signal, said generator being varied in frequency so that energy transmitted during one oscillatory period will be received by a succeeding oscillatory period.

4. A superregenerative distance measuring device comprising a self-quenching oscillator circuit having a variable component part to vary the frequency of the self-quench, an antenna coupled with said circuit, said circuit and said antenna both transmitting and receiving during the oscillatory period of said oscillator, said variable component part being varied until the energy transmitted during one oscillatory period strikes an object and is reflected and received during a succeeding oscillatory period, and means to indicate the reception of a signal.

5. A superregenerative measuring apparatus comprising a grid leak oscillator circuit, an antenna coupled thereto, a variable frequency voltage generator coupled to said circuit to render the circuit periodically operable, at which time the circuit and antenna both transmit and receive radio energy simultaneously, the generator being varied in frequency until the energy transmitted during one period is reflected and received during a succeeding period after striking and being reflected by an object, and means to indicate the reception of a signal during a period.

6. A superregenerative measuring apparatus comprising a grid bias oscillator circuit, an antenna coupled thereto, a variable frequency voltage generator coupled to said circuit to render the circuit periodically operable, at which time the circuit and antenna both transmit and receive radio energy simultaneously, the generator being varied in frequency until the energy transmitted during one period is reflected and received during a succeeding period after striking and being reflected by an object, and means to indicate the reception of a signal during a period.

7. A superregenerative measuring apparatus comprising an oscillator circuit, an antenna coupled thereto, a variable frequency voltage generator coupled to said circuit to render the circuit periodically operable, at which time the circuit and antenna both transmit and receive radio energy simultaneously, the generator being varied in frequency until the energy transmitted during one period is reflected and received during a succeeding period after striking and being reflected by an object, and means to indicate the reception of a signal during a period.

8. A superregenerative measuring apparatus comprising an oscillator circuit, a movable directional antenna coupled thereto, variable means making said circuit periodically operable at which time the circuit and antenna will both transmit and receive simultaneously, the means being varied in frequency until the energy transmitted during one period strikes an object which may be sought out by the directional antenna and is reflected and received, by a succeeding period, and means to indicate the reception of a signal during a period.

9. A superregenerative measuring apparatus comprising an oscillatory circuit, an antenna coupled therewith, a variable means making said circuit periodically operable, at which time the circuit and antenna will both transmit and receive simultaneously the means being varied in frequency until the energy transmitted during one period is reflected and received during a succeeding pulse, and means to indicate the reception of a signal during a period.

10. Distance measuring radio apparatus comprising a circuit and antenna coupled therewith to simultaneously transmit and receive radio energy, variable means to render said circuit periodically operable, and means to indicate the reception of a signal, the variable means being varied until the energy transmitted at one strikes an object and is reflected and received on a succeeding period, the frequency of the variable means giving a measure of the distance to the reflecting object.

11. In distance measuring apparatus, an antenna system, an electric discharge device having input and output circuits operatively connected with said antenna system, said output and input circuits being linked in positive feedback relationship, means for supplying electric energy to said discharge device, means for periodically varying the gain in said device at an adjustable rate, the maximum gain having a value producing oscillations in the absence of external stimuli, means for indicating the amount of electric energy supplied to said dscharge device, and means for indicating the repetition rate of said variations in gain.

12. In distance measuring apparatus, an antenna system, an electric discharge device having input and output circuits operatively connected with said antenna system, said output and input circuits being linked in positive feedback relationship, means for supplying electric energy to said discharge device, means for periodically varying the gain in said device at an adjustable rate, the maximum gain having a value producing oscillations in the absence of external stimuli and the minimum gain permitting oscillations to die away, means for indicating the amount of electric energy supplied to said discharge device, and means for indicating the repetition rate of said variations in gain.

13. In distance measuring apparatus, an antenna system, an electric discharge device having input and output circuits operatively connected with said antenna system, said output and input circuits being linked in positive feedback relationship, means for supplying electric energy to said discharge device, means for periodically varying the gain in said device at an adjustable rate, the maximum gain having a value producing oscillations in the absence of external stimuli and the minimum gain permitting oscillations to die away, indicating means responsive to changes in the amount of electric energy supplied to said discharge device, and means for indicating the repetition rate of said variations in gain.

14. The method of operating a superregenerative circuit and antenna to measure the distance of an object from the antenna comprising, the steps of transmitting oscillation groups at a quench frequency, varying said quench frequency to place the circuit in a receiving condition at the time the reflected energy is intercepted by the antenna, and utilizing the value of said quench frequency to determine the distance of said object from said antenna.

15. The method of operating a superregenerative circuit to measure distances from the circuit to an object comprising the steps of transmitting oscillation groups at a quench frequency, varying the quench frequency to place the circuit in a receiving condition for reflected oscillation groups delayed by periods which are substantially integral multiples of the quench frequency period, and utilizing the value of said quench frequency to determine the distance of said object from said antenna.

HENRY T. WINCHEL.

REFERENCES CITED

The following references are of record in the file of this patent:

UNITED STATES PATENTS

| Number | Name | Date |
| --- | --- | --- |
| 2,211,091 | Braden | Aug. 13, 1940 |
| 1,924,174 | Wolf | Aug. 29, 1933 |

FOREIGN PATENTS

| Number | Country | Date |
| --- | --- | --- |
| 108,875 | Australia | Oct. 20, 1939 |

Disclaimer 2,422,382.—*Henry T. Winchel*, North Hollywood, Calif. DISTANCE MEASURING APPARATUS. Patent dated June 17, 1947. Disclaimer filed July 11, 1949, by the assignee, *Bendix Aviation Corporation*.

Hereby enters this disclaimer to claims 9, 10, 13, 14, and 15 in said specification.

[*Official Gazette August 16, 1949.*]